G. E. DAVIS.
HARROW.
APPLICATION FILED MAR. 7, 1911.
1,018,301.
Patented Feb. 20, 1912.
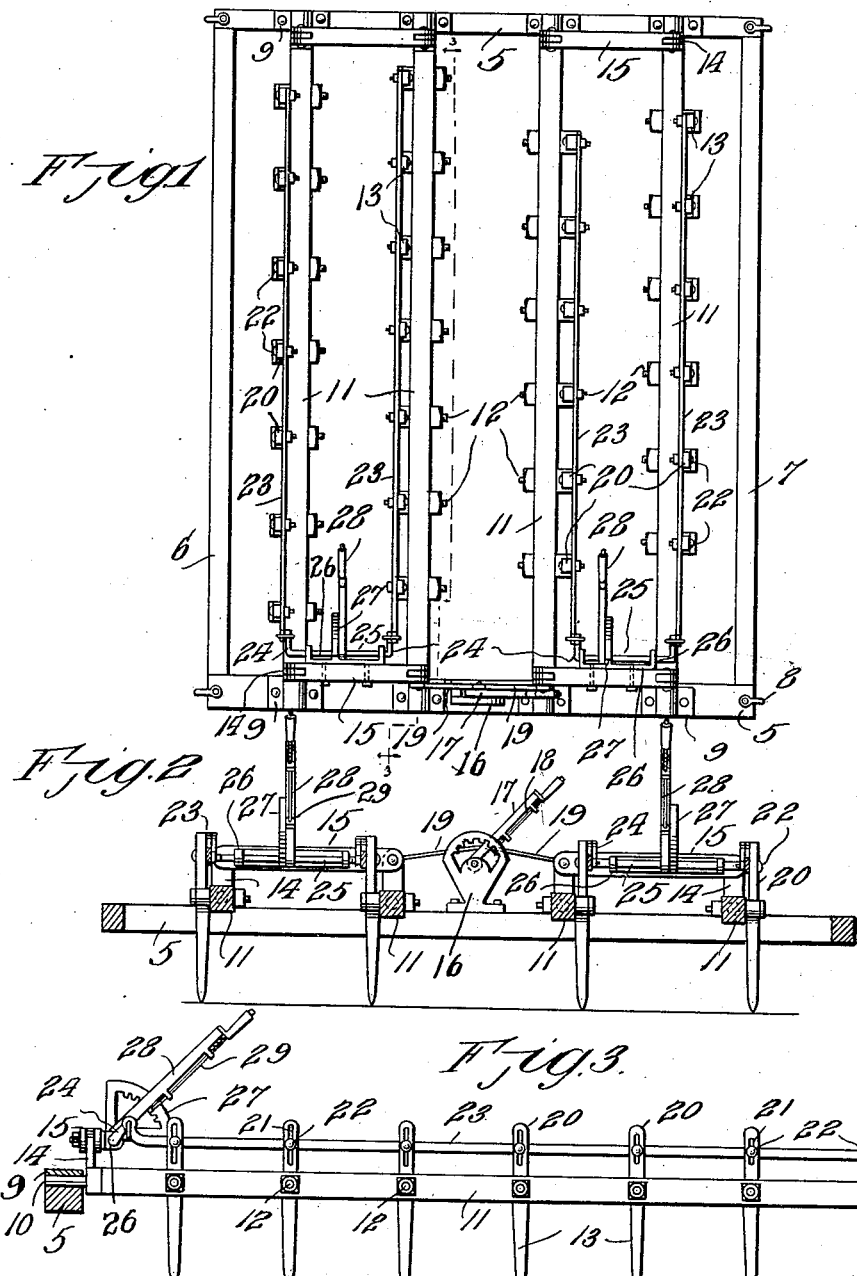
Witnesses
Frank Hough
M. O. Paulees
Inventor
George E. Davis,
By Victor J. Evans
Attorney

UNITED STATES PATENT OFFICE.

GEORGE E. DAVIS, OF VISALIA, CALIFORNIA.

HARROW.

1,018,301.  Specification of Letters Patent.  Patented Feb. 20, 1912.

Application filed March 7, 1911. Serial No. 612,736.

*To all whom it may concern:*

Be it known that I, GEORGE E. DAVIS, a citizen of the United States, residing at Visalia, in the county of Tulare and State of California, have invented new and useful Improvements in Harrows, of which the following is a specification.

The invention relates to a harrow, and more particularly to the class of adjustable toothed harrows.

The primary object of the invention is the provision of a harrow in which the teeth thereof may be adjusted longitudinally with respect to the line of draft, and also laterally, thus enabling the proper angular disposition of the teeth for harrowing purposes.

Another object of the invention is the provision of a harrow in which the teeth thereof may be adjusted in series either laterally or longitudinally of the main frame, the adjustment being accomplished by means of throw levers, which are capable of being locked in their adjusted position.

A further object of the invention is the provision of a harrow in which the teeth thereof may be shifted at various angular positions with respect to the ground for tilling the same, whereby it may be disintegrated and loosened for farming purposes.

A still further object of the invention is the provision of a harrow of this character which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in claims hereunto appended.

In the drawings: Figure 1 is a top plan view of a harrow constructed in accordance with the invention. Fig. 2 is a vertical transverse sectional view thereof. Fig. 3 is a sectional view on the line 3—3 of Fig. 1.

Similar reference characters indicate corresponding parts throughout the several views of the drawings.

Referring to the drawings by numerals, the frame of the harrow comprises spaced end beams 5, front and rear beams 6 and 7, respectively, the same being united in the usual well-known manner, and secured in the ordinary way to the opposite ends of the end beams 5 are clevises 8 for the connection of a draft attachment, so it will be obvious that the frame may be dragged through a field either from the rear side thereof or from its front side. Fixed upon the end arms 5 in spaced alining relation to each other are suitable bearings 9 in which are journaled reduced trunnion ends 10 of transversely disposed teeth carrying beams 11, on which are connected by means of pivots 12 a plurality of harrow teeth 13 which are arranged in spaced relation to each other.

Formed at the opposite ends of the teeth carrying beams 11 are upstanding ears 14, to which are pivotally connected throw links 15 which unite the bars for rocking movement in independent pairs. Fixed to one end beam 5 of the frame is an internally toothed segment 16, to which is pivotally connected a throw lever 17, the latter being provided with the usual spring-held manually operable locking pawl or dog 18 which normally engages the teeth of the segment 16 for holding the throw lever 17 in adjusted position. At opposite sides of the point of pivotal connection of the throw lever 17 with the segment 16 and connected to said lever are connecting rods 19, the same being also pivotally connected to the pivots connecting the links 15 to the ears 14 thereon, so that when the throw lever 17 is actuated, the tooth carrying bars 11 will be shifted in unison, the throw lever 17 being designed to shift the harrow teeth 13 longitudinally of the main frame with respect to the line of draft thereof.

The harrow teeth 13 are provided with upstanding extensions 20 containing elongated slots 21, in which are engaged guide lugs 22 projecting from shifting bars 23, the same being connected to the cranks 24 of rocking shafts 25 which are suitably journaled in bearing brackets 26 fixed to the adjacent links 15. Formed on these bearing brackets 26 are toothed segments 27 and integral with the rocking shafts 25 are throw levers 28, the latter being provided with the usual manually operable locking dogs or pawls 29 which engage the teeth of the segments 27 for locking the throw levers in adjusted position, the throw levers 28 being adapted to shift the rods 23 for angularly adjusting the harrow teeth 13 laterally with respect to the line of draft of the main frame.

It is obvious that the teeth upon the pairs of teeth carrying beams 11 may be reversely shifted when desired, so that the teeth upon the front or rear teeth carrying beams 11 may be shifted laterally in one direction, while the teeth on the other pair of beams may be shifted in the opposite direction.

The operation of the harrow is identical to those ordinarily used, with the exception that by the construction and arrangement, the teeth may be shifted laterally or longitudinally with respect to the line of draft of the harrow. Also it is possible for one series of teeth to be shifted in one direction, while the other series of teeth is shifted in the opposite direction.

What is claimed is:

1. A harrow, comprising a frame, bearings fixed to the upper face of the frame at opposite ends thereof, rocking beams journaled in said bearings, ears rising from opposite ends of the beams, throw links pivoted to the ears for connecting the beams in pairs, harrow teeth pivoted at intervals to the beams and having extensions rising above the same, brackets connected to the throw links at one end of the frame, shifting bars connected with the extensions of the harrow teeth, cranks journaled in said brackets and having their ends pivotally connected to the shifting bars, toothed segments formed on the brackets, throw levers fixed to the cranks and having locking means engageable with the toothed segments for holding the harrow teeth in adjusted position laterally of the frame, and means for rocking the pairs of beams in unison at right angles to the lateral adjustment of the harrow teeth.

2. A harrow, comprising a frame, bearings fixed to the upper face of the frame at opposite ends thereof, rocking beams journaled in said bearings, ears rising from opposite ends of the beams, throw links pivoted to the ears for connecting the beams in pairs, harrow teeth pivoted at intervals to the beams and having extensions rising above the same, brackets connected to the throw links at one end of the frame, shifting bars connected with the extensions of the harrow teeth, cranks journaled in said brackets and having their ends pivotally connected to the shifting bars, toothed segments formed on the brackets, throw levers fixed to the cranks and having locking means engageable with the toothed segments for holding the harrow teeth in adjusted position laterally of the frame, a segment fixed to the frame between the pairs of rocking beams, a throw lever pivoted to the last-named segment and having means for locking engagement therewith, and oppositely extending links connected with the last-named throw lever and also pivoted to the throw links adjacent thereto, so that the rocking beams may be shifted at right angles to the lateral adjustment of the harrow teeth.

In testimony whereof I affix my signature in presence of two witnesses.

GEORGE E. DAVIS.

Witnesses:
H. J. VERFURTH,
A. J. HULLNIGHT.

---

Copies of this patent may be obtained for five cents each, by addressing the "Commissioner of Patents, Washington, D. C."